United States Patent

Nemeth et al.

[11] Patent Number: 5,876,163
[45] Date of Patent: Mar. 2, 1999

[54] CNC BORE SLOTTING MACHINING SYSTEM

[76] Inventors: Fred Nemeth, 234 Bransgrove Road, Panania, Australia, NSW 2213; Mark Kuenzle, 19A Culwalla Street, South Hurstville, Australia, NSW 2221; Paul Frecker, 20 Don Street, Newtown, Australia, NSW 2042

[21] Appl. No.: 793,171
[22] PCT Filed: Aug. 30, 1995
[86] PCT No.: PCT/AU95/00550
 § 371 Date: May 12, 1997
 § 102(e) Date: May 12, 1997
[87] PCT Pub. No.: WO96/06704
 PCT Pub. Date: Mar. 7, 1996

[30] Foreign Application Priority Data

Aug. 30, 1994 [AU] Australia ................. PM7742

[51] Int. Cl.$^6$ .................................................. B23D 5/02
[52] U.S. Cl. ...................... 409/307; 409/260; 409/304; 409/318
[58] Field of Search ............................ 409/260, 292, 409/289, 304, 305, 307, 317, 318, 324, 326, 328

[56] References Cited

U.S. PATENT DOCUMENTS

| | | | |
|---|---|---|---|
| 1,367,680 | 2/1921 | Allen | 409/304 |
| 2,437,794 | 3/1948 | Varmee | 409/326 |
| 2,551,359 | 5/1951 | Bannow et al. | 409/304 |
| 4,054,043 | 10/1977 | Eibe | 72/8 |
| 4,154,145 | 5/1979 | Bishop | 409/307 |
| 4,488,841 | 12/1984 | Brown | 409/289 |
| 4,978,263 | 12/1990 | Sheppard | 409/307 |
| 5,078,559 | 1/1992 | Abe et al. | 409/304 |
| 5,328,309 | 7/1994 | Bishop et al. | 409/307 |
| 5,346,343 | 9/1994 | Babel | 409/211 |

FOREIGN PATENT DOCUMENTS

| | | |
|---|---|---|
| B-88421/91 | 6/1992 | Australia . |
| B-15699/92 | 11/1992 | Australia . |
| 0 477 422 A1 | 4/1992 | European Pat. Off. . |
| 59-115112 | 7/1984 | Japan ................ 409/304 |

*Primary Examiner*—Andrea L. Pitts
*Assistant Examiner*—Christopher Kirkman
*Attorney, Agent, or Firm*—Cohen, Pontani, Lieberman & Pavane

[57] ABSTRACT

A bore slotting machine for cutting radially spaced longitudinal slots in sleeves for automotive power steering units comprising a cutting face adapted to operate with a bore of a component being worked; a motorized drive adapted to impart reciprocating motion to the cutting face; a positional feedback device associated with the cutting face and adapted to communicate with a computer; a chuck adapted to hold a component being worked at a location adjacent the cutting face and being supported for indexible rotational movement about a Y axis substantially parallel to that of the bore in the component being worked; a first shuttle carriage carrying the workholding device such shuttle being adapted for linear motion perpendicular to the bore axis of the component under the influence of a first servo drive; a second shuttle carriage adapted to carry the cutting face and associated motorized drive such that movement of the second carriage achieves linear reversible relative motion between the component being worked and the cutting face along an axis parallel to the bore axis; a second servo drive for actuating the second shuttle carriage; a controlling computer for activating the cutting face drive and synchronizing the first and second servo drives with the position of the cutting face; each drive having a closed loop control system incorporating a feedback device.

11 Claims, 2 Drawing Sheets

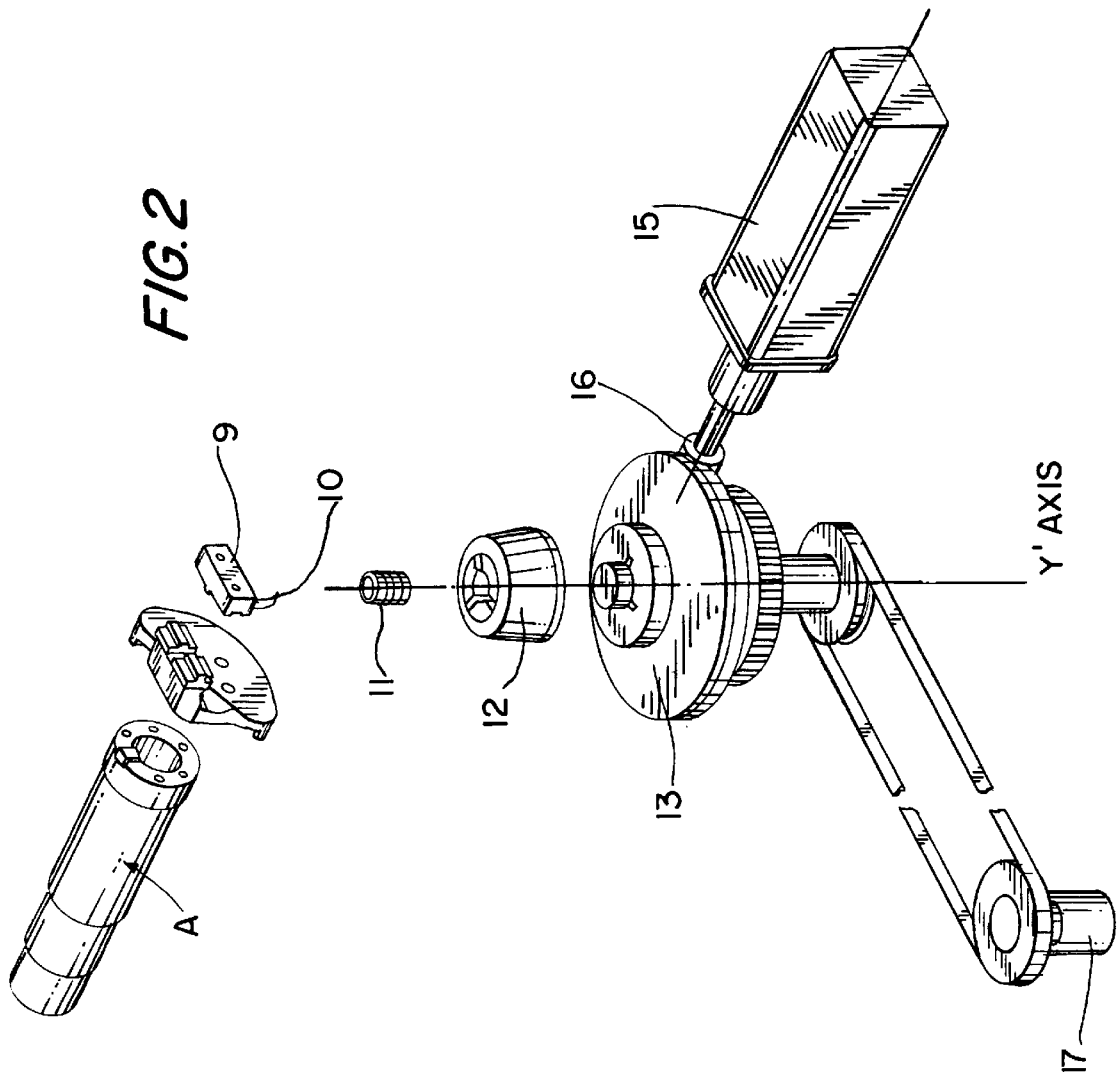

CNC BORE SLOTTING MACHINING SYSTEM

The present invention relates to bore slotting machinery and in particular to apparatus of the type utilising a reciprocating cutting face to produce one or more longitudinal slots in the bore of a component.

For many year various apparatus have been proposed for cutting longitudinal slots in the bores of relatively small sleeves such as those utilised in automotive rotary power steering valves. The design of such machinery necessarily involves relative movement between the cutting face and the component being worked along and about multiple axes; precision synchronisation of the high speed movements relative to the various axes being of critical importance. In addition to the synchronised movements required to achieve the actual cut the cutting face of the tool and/or the workholding member must be capable of movement to facilitate loading and unloading of the workholding member without interference with the cutting face.

To date a number of mechanical arrangement have been proposed in order to achieve the high speed synchronised relative movement between a workholding member and the cutting face necessary for the cutting operation and also to facilitate relative displacement of the component for loading and unloading during both the cutting and loading/unloading operations.

It is the object of the present invention to provide an alternate bore slotting machine which utilises computer controlled servo drives to control and synchronise at least some of the relative motions between the cutting face and the workholding member. The term "servo drive" where used throughout this specification is intended to encompass any type of servo driven motor or actuator including conventional motors, servo motors, linear motors, hydraulic activators, pneumatic linear actuators and rotary actuators.

The use of a servo drive system as opposed to mechanical configurations to control bore slotting machinery is particularly advantageous as it has been found that comparable speeds may be obtained to those achieved by mechanically synchronised equipment whereas electronically synchronised equipment eliminates the need for complicated mechanical linkages and is not subject to the wear rates and associated frequent service requirements of mechanically synchronised equipment.

Electronically synchronised bore slotting machinery is furthermore better adapted for situations where components of different dimensions are to be produced having regard to the fact that the CNC parameters may be programmed, stored and recalled far more quickly than replacement, adjustment and/or alteration of mechanical components of comprising the system.

In addition, greater accuracy of the position, size and surface finish of the generated slots may be achieved because of the mechanical simplicity of the servo controlled machinery, and the ability to use feedback to compensate for variation and imperfections in the machine elements.

According to the present invention there is provided a bore slotting machine comprising a cutting face adapted to operate within a bore of a component being worked; a motorised drive adapted to impart reciprocating motion to the cutting face; an electronic positional feedback device associated with the cutting face; a workholding device adapted to hold a component being worked at a location adjacent the cutting arm and being supported for indexible rotational movement about an axis substantially parallel to that of the bore in the component being worked; a first shuttle being adapted for linear movement along an axis parallel to the bore axis and a second shuttle carrying either the workholding device or the cutting face, the second shuttle being adapted for linear motion perpendicular to the bore axis of the component under the control of a servo drive; the first shuttle carriage adapted to carry parts of the machine such that movement of the carriage achieves linear reversible relative motion between the component being worked and the cutting face parallel to the bore axis; a servo drive for actuating the first shuttle carriage; computer control means for activating the two servo drives and synchronising the two drives; each drive having a closed loop computer control system incorporating a feedback device.

One embodiment of the present invention will now be described with reference to the accompanying drawings in which:

FIG. 2 is an exploded perspective view of part of the machine of FIG. 1.

Figure 1:
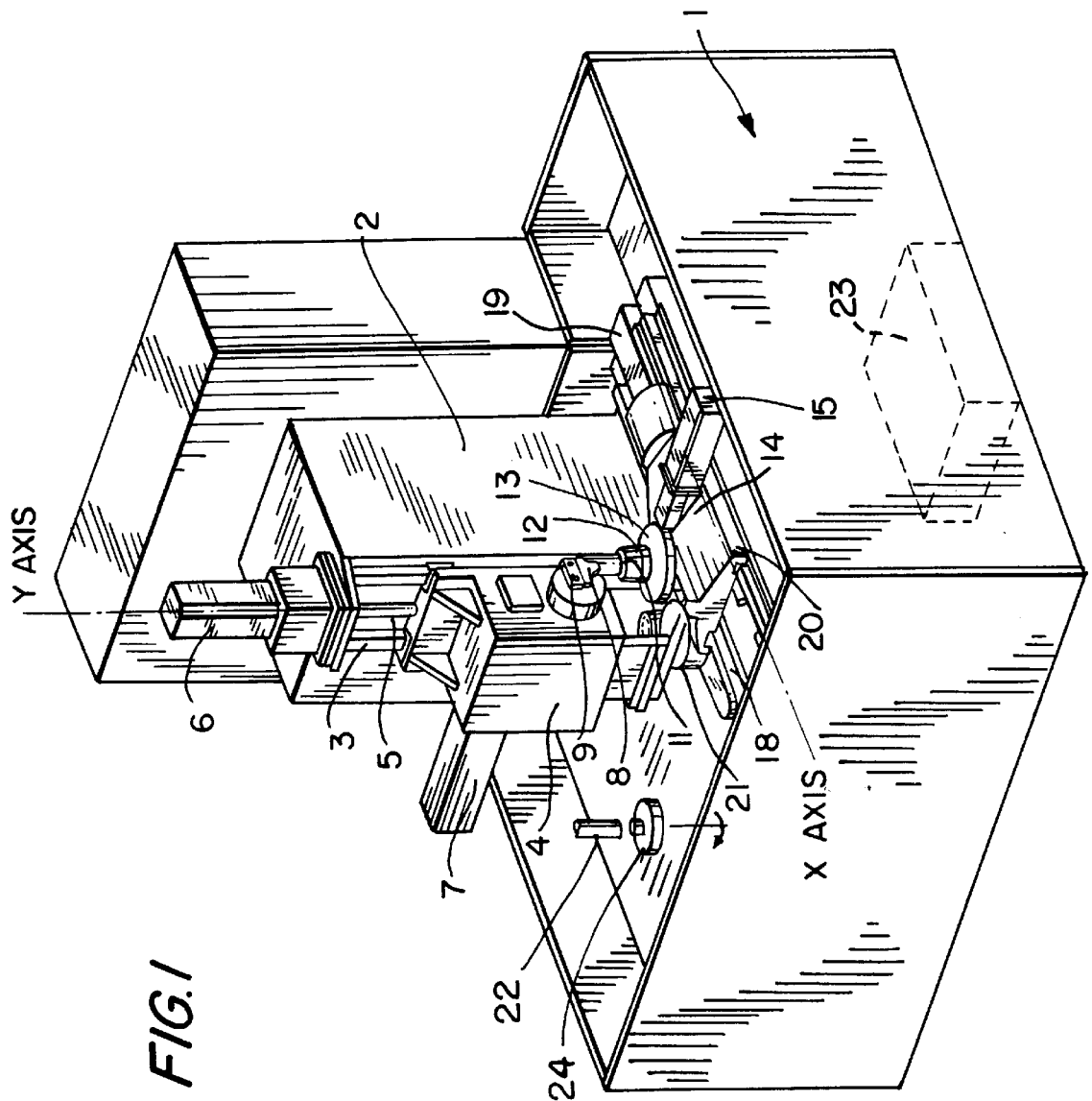
FIG. 1 is a perspective view of a machine in accordance with the present invention.

The embodiment of FIG. 1 depicts a CNC machining system having a base 1 with an upstanding column 2 extending thereabove. Upstanding column 2 is provided with guide rails 3 adapted to constrain a first shuttle carriage 4 for a range of reversible vertical movement under the influence of drive shaft 5 operated by linear electric servo drive 6.

Electric servo drive 7 is mounted to shuttle carriage 4 via an appropriate translatory crank mechanism (not shown) adapted to impart oscillatory reversing rotational movement to spindle 8 and angular reciprocating motion to cutting arm 9 and cutting face 10.

As may best be viewed from FIG. 2 the sleeve 11 being worked is held in chuck 12 mounted in turn to spindle 13. Spindle 13 is mounted on a second shuttle carriage 14 and is capable of being rotated about a "Y" axis by servo drive 15 and intermediate worm drive 16. Closed loop control of servo drive 15 is facilitated by feedback device 17 being a rotary encoder. Shuttle carriage 14, servo drive 15, chuck 12 and hence the sleeve 11 being worked are all supported for reversible linear travel along axis X by rails 18 under the influence of electric servo drive motor 19 and ball screw drive shaft 20.

It will be appreciated that the reciprocating arcuate travel of cutting arm 9 imparts reciprocating arcuate travel to cutting face 10. In order that this arcuate travel of cutting face 10 is capable of cutting slots aligned with axis Y' in the bore sleeve 11 a fast reciprocating motion must be imparted to shuttle carriage 14 in order to maintain full relief of the cutting head 10 from the work face in the bore of sleeve 11 during the return stroke of the cutting arm as opposed to the cutting stroke. For each cutting stroke the cutting head must be advanced to a new position and held stationary for the full duration of engagement of the cutting face in the bore. This reciprocating motion of shuttle carriage 14 must be synchronised with the oscillating arcuate movement of cutting face 10 to maintain the correct relative position profile and hence there is common computer control (not shown) of the two drives. The control of these servo drives is also of a closed loop nature such that feedback devices constantly input to the controlling computer the position of the components controlled by the respective drives.

Drive 19 is also responsible for moving chuck 12 and hence sleeve 11 from the working position depicted in unbroken lines in FIG. 1 to the loading and unloading position depicted in broken lines at 21 in FIG. 1.

It will furthermore be appreciated that servo drive 19 by way of its control of shuttle 14 is also responsible for controlling the depth of cut for the slot (not shown) being formed by cutting face 10 in the bore of sleeve 11 and hence drive 19 is responsible for advancing sleeve 11 onto cutting face 10 during the cutting operation.

It will also be appreciated that the first shuttle carriage 4 may carry the sleeve 11 and second shuttle carriage 14 may carry the cutting face 10, such that the sleeve 11 is moved parallel to the Y axis and the cutting face 10 is moved along the X axis. In this embodiment, the servo drives 6 and 19 are controllable to effect the same motion of the cutting face relative to the sleeve as in the previous embodiment, however, since the sleeve is above the cutting face 10, the bottom of the sleeve 11 would be cut by the cutting face 10.

Electric servo drive motor 15 is responsible for determining the radial position of the slot (not shown) being cut by cutting face 10 in sleeve 11 as it controls via worm drive 16 and chuck 12 rotation of sleeve 11 relative to cutting face 10. Once again this motion must be synchronised with that of servo drives 7 and 19. Synchronisation is best achieved by way of common computer control and closed loop control of each drive facilitated by feedback devices (only one shown at 17). Typically a number of radially separated slots parallel with axis Y' would be cut in sleeve 11 and drive 15 would control the radial separation of the slots.

The rotation of chuck 12 by electric servo drive motor 15 not only determines the radial displacement of one slot from an adjacent slot but also achieves compensation for any lack of concentricity in the sleeve identified during a probing operation performed by the machine prior to the cutting operation.

The aforementioned probing operation will now be described hereafter. The probing operation will be familiar to any person skilled in the art of machining circular objects which need to have controlled runout in order that the finished product may fall within acceptable concentricity ranges.

A sleeve being worked is loaded onto an input conveyor with its axis in a vertical orientation. The input conveyor then carries the sleeve to a loading station where the sleeve is transferred from the conveyor to a pick-up nest. A four position indexing unit fitted with gripper arms lowers, grips the sleeve, raises, then indexes ninety degrees to the probe station 22 where it lowers, releases the sleeve, then raises away from the probe station.

At the probe station the sleeve is clamped within a collet. The collet is then rotated, via a toothed belt drive, until the hitch pin hole is located and positioned via a photo-electric cell. The sleeve is then maintained in this orientation for probing before loading into the machining station. After orientation, the probe unit lowers and measures the runout of the sleeve bore relative to the O.D. of the sleeve and the hitch pin hole position. This data is then stored in the control computer for later use in cutting position competisation during the machining operation.

It will be appreciated that once the concentricity information has been obtained with respect to a particular component in the conventional manner above described the information may readily be incorporated into the programming of the control computer such that chuck 15 may be rotated prior to the cutting operation so as to ensure that all slots which are cut are radially aligned with the centre of the bore of the component as compared with the actual centre of the clamping axis. The clamping axis is related to the external surface of a component as well as the axis about which the chuck rotates. Compensation in this manner may result in slots on one side of the sleeve being slightly deeper than slots on the other side of the sleeve although this is of little consequence in relation to many components which are manufactured by the subject machinery and in particular power steering sleeves for automobiles. It is more important that the radial disposition of the slots is true to the internal bore dimensions of the component rather than to have slots of precisely the same depth.

Electric servo drive motor 6 is responsible for removing cutting face 10 from sleeve 11 to facilitate loading of fresh sleeves to be worked and unloading of worked sleeves. In the case of some longer slots it is also necessary to move first shuttle carriage 4 as the cutting of each individual slot progresses in order that the cutting face may be imparted with adequate reach for the desired length of slot. It is therefore desirable that drive 6 is similarly linked to a common computerized control unit (not shown) to that controlling drives 15, 19 and 7 in order that the cutting action may proceed in each sleeve and from sleeve to sleeve. Once again closed loop computer control is utilised with a feedback device (not shown) imparting control over the precise position of the cutting face at any time.

The applicant has found that the Siemens Sinumerik 840 C TM range of CNC controllers are appropriate for controlling the electronic servo drives utilised in the abovementioned embodiment and that, rather than conventional CNC programming, interpolation and compensation with tables is utilised with the spindle axis as the master axis and the remaining drives configured as slave axes. In this manner the table of relationships between slave function positions and master function positions may be loaded into the computers memory prior to the running of the programmed cycle as opposed to such information being progressively loaded during the cycle as is the case in normal CNC programming. Far superior processing speed is thereby achieved. Block cycle times of 4.0 milliseconds have been utilised with interpolation clock cycles of 4.0 milliseconds, position control cycles of 1.0 millisecond and drive basic cycle times of 0.5 milliseconds.

For simplicity FIG. 1 does not include detail of ancillary equipment necessary for operation of bore slotting machinery such as apparatus for loading and unloading sleeves from the chuck and for removing cutting material.

We claim:

1. A bore slotting machine comprising:

a cutting face insertable within a bore of a component being worked;

a motorized drive for imparting reciprocating motion to the cutting face;

a positional feedback device associated with the cutting face and in communication with a computer;

a workholding device for holding a component being worked at a location adjacent the cutting face and being supported for indexible rotational movement about a Y' axis substantially parallel to that of the bore in the component being worked;

a first shuttle carriage and a second shuttle carriage;

the second shuttle carriage carrying one of the workholding device and the cutting face, the second shuttle carriage being displaceable for linear motion substantially perpendicular to the Y' axis;

the first shuttle carriage for carrying part of the machine such that movement of the first shuttle carriage achieves linear reversible relative motion between the component being worked and the cutting face along an axis substantially parallel to the Y' axis;

a first servo drive for actuating the first shuttle carriage;

a second servo drive for actuating the second shuttle carriage; and a computer for controlling the cutting face drive and synchronizing the first and second servo drives with the position of the cutting face.

2. A bore slotting machine in accordance with claim 1, wherein each drive has a closed loop control system incorporating a feedback device.

3. A bore slotting machine in accordance with claim 1, wherein the reciprocating motion of the cutting face is angular reciprocating motion about an axis perpendicular to the bore of the component being worked.

4. A bore slotting machine in accordance with claim 1, wherein the reciprocating motion of the cutting face is linear reciprocating motion along an axis parallel to that of the bore of the component being worked.

5. A bore slotting machine in accordance with claim 1, wherein the second shuttle carriage carries the workholding device and the first shuttle carriage carries the cutting face and associated motorized drive.

6. A bore slotting machine in accordance with claim 1, wherein the indexible rotational movement of the workholding device about the Y'axis is imparted by a third servo drive under the control of the computer and synchronized to at least the cutting face drive.

7. A bore slotting machine in accordance with claim 1, wherein the computer controls the servo drives using a program utilizing the cutting drive as a master drive and the remaining drives as slave drives.

8. A bore slotting machine in accordance with claim 1, wherein the computer control for the servo drives provides interpolation and compensation using tables with the cutting face drive as a master drive and the remaining drives as slave drives.

9. A bore slotting machine in accordance with claim 1, wherein the first servo drive comprises a linear electronic motor drive.

10. A bore slotting machine in accordance with claim 1, wherein the second servo drive comprises a linear motor.

11. A bore slotting machine in accordance with claim 1, further comprising:

a runout measuring probe for determining runout information based on differences between an external clamping diameter of the component being worked and an internal bore diameter of the component;

means for transferring the runout information to the computer;

means for adjusting rotational movement of the workholding device based on the runout information to ensure that radial disposition of slots being cut in the bore is referenced to the center of the bore of the component rather than a center of the external clamped diameter of the component.

* * * * *